No. 631,766. Patented Aug. 22, 1899.
W. J. HOLMAN, Jr.
SYSTEM OF EDUCATIONAL PLAYING CARDS.
(Application filed Jan. 23, 1899.)
(No Model.)
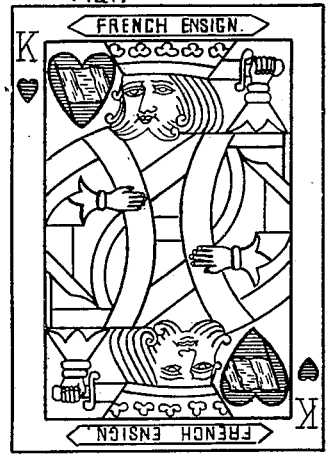
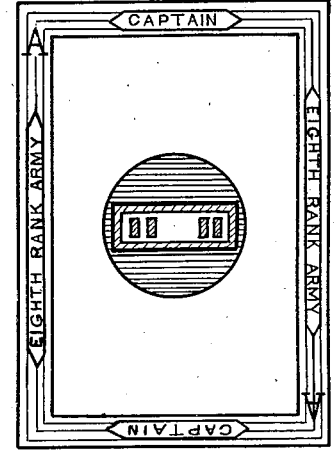
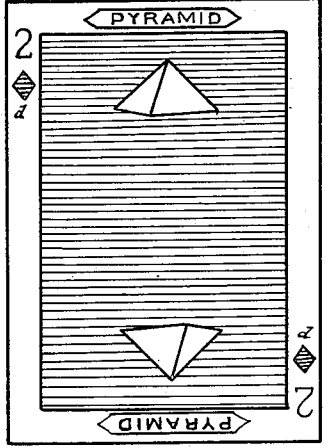
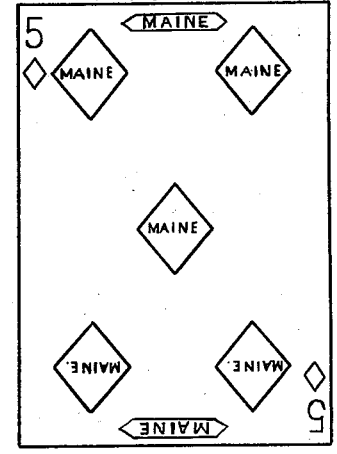
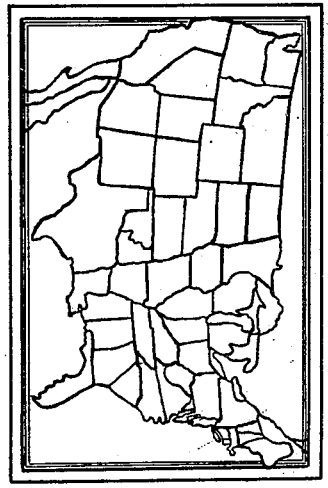
WITNESSES.
William J. Holman Jr.
INVENTOR
By Charles H. Woodward
Atty.

UNITED STATES PATENT OFFICE.

WILLIAM J. HOLMAN, JR., OF MINNEAPOLIS, MINNESOTA.

SYSTEM OF EDUCATIONAL PLAYING-CARDS.

SPECIFICATION forming part of Letters Patent No. 631,766, dated August 22, 1899.

Application filed January 23, 1899. Serial No. 703,158. (No model.)

*To all whom it may concern:*

Be it known that I, WILLIAM JENNINGS HOLMAN, Jr., a citizen of the United States, residing at Minneapolis, in the county of Hennepin and State of Minnesota, have invented a new and useful System of Educational Playing-Cards, of which the following is a specification.

My invention relates to educational playing-cards in which the educational feature operates in conjunction with the plan of the ordinary playing-cards, the object being to furnish a means of absorbing information while engaged in playing a game of "whist," "euchre" or any card game.

To attain this object, I preserve as nearly as possible the appearance of the ordinary playing-cards, so that the innovations hereinafter mentioned may not be confusing to those used to the common cards, and I treat a subject of study so generally and with so much simplicity that the graphic manner in which it is displayed on the cards, the number of times it is reproduced on said cards, and it being so intimately connected or associated with that portion of the card to which the eye is constantly directed that the information thereon contained is almost unconsciously absorbed.

With such end in view the invention consists in dividing a subject of study, as history, geography, or the like, into items and placing these items upon the cards in the manner about to be set forth.

The invention consists, first, in subdividing the principal features of a given subject of study into separate and complete items of information, and vice versa, in classifying for a set of cards miscellaneous items of information under a common head, and arranging one or more of said items or parts of information upon one or more cards, as follows, to wit: (*a*) in connection or associated with the conventional "spots" of "hearts," "spades," "diamonds," and "clubs" by supplanting the conventional "spots" in the body of the card with the educational matter and leaving the indexes as they are now, or by placing the educational features within the lines of the said conventional "spots" or the said "spot" or "spots" within or over the educational feature, and (*b*) in the same relative location as the said conventional "spots," but in their stead in this case to distinguish the "suit" the items of information may be tinted, or tints, devices, or characters may be used, as hereinafter stated, for said purpose; second, in distinguishing the "suits," in cases where the conventional "spots" of "hearts," "spades," "diamonds," and "clubs" have been dispensed with, by tinting the items of information, or when the information has a variety of colors, as in the case of flags, by using as a background for such information tinted circles (or some other geometrical figure) in order that the "suits" may be distinguished thereby, and in some cases I may tint the cards themselves to distinguish the "suits;" third, in arranging when practicable upon the backs of the cards a given subject of study in its entirety or in further presentation or in illustration of the particular subject treated; fourth, in occupying when practicable the body of the "honor" cards with matter appropriate or in connection with the subject treated in any particular set; fifth, in placing when practicable the conventional faces of the "honor" cards used in the ordinary playing-cards with faces appropriate or connected with the subject treated in any given set; sixth, in utilizing the whole or a portion of the margins of the cards when required in naming or describing the items or parts of information that are used as the spots on the cards, or I may place this descriptive matter on or beneath said "spots," and, seventh, in tinting the margins of the cards or occupying the same with characters and devices as indexes to represent the suits and the value of the card, said devices bearing the same color as that borne by the "spots."

The invention further consists in such other modifications as are hereinafter shown and described, and pointed out in the claims.

In illustration of my invention reference is made to the accompanying drawings, in which—

Figure 1 represents a conventional "king" card with such modifications introduced as will illustrate the manner of employing my invention in connection therewith. Fig. 2 shows one design of a "king" card with such modifications and additions as will adapt it for use in connection with my improved educational playing-cards. It will be seen that in this case the conventional "spot" is supplanted by a tinted circle as a background for the item of information to designate the "suit." Fig. 3 represents one form of the "ace" cards of my improved educational playing-cards with the conventional "spot" also supplanted by a tinted circle. Fig. 4 represents one form of a "three-spot" card. Fig. 5 represents one form of a "two-spot" card. In this case the item of information itself may be tinted to designate the "suit." Fig. 6 represents one form of a "five-spot" card, illustrating still further the arrangement of the matter on the cards. Fig. 7 represents the back of one of the cards, illustrating one means of utilizing the backs of the cards.

In Fig. 1 the center of the ordinary "spot" designating the "suit" is occupied by the representation of the French ensign, showing one card of a "deck" in which flags of the various nations are the selected subject of study. This figure also illustrates one method of retaining the conventional "spots" of "hearts," "spades," "diamonds," and "clubs" by introducing the educational matter within the area of the "spot."

In Fig. 2 is shown how the educational feature can be worked into the complete design of an ordinary "king" card. The center of the card contains a representation of the Western Hemisphere, in which the United States, including Alaska, will be tinted in a distinctive color, with a face of a conventional "king" replaced by that of Washington, with the presidential ensign substituted for the "spot" designating the "suit," thus making a chain of circumstances relative to each other. In this figure it is also shown how the conventional "spot" can be dispensed with by placing in its stead tinted circles (or some other geometrical figure) as a background bearing some color to designate the "suit." (This is usually done when the matter to be placed on the cards has a variety of color, as in the case of flags, &c.)

In Fig. 3 is shown an "ace" card, the educational feature being a representation of a shoulder-strap of a captain of the United States Army and also with information concerning a captain of the United States Army on the margin of the card. This figure also shows how a colored margin can be employed as an index to the "suit."

In Fig. 4 is shown a "three-spot" card, the conventional "spot" being placed within or over the educational feature.

In Fig. 5 is shown a "two-spot" card and illustrates how either the "spot" or the card itself can be tinted to designate the "suit" and also how the educational feature can be connected with the conventional "spots" by retaining the latter as an index. In this event it will be tinted the same color as the "suit."

Fig. 6 shows a "five-spot" card, the educational feature being placed within the conventional "spot," thus using the ordinary form and color.

In Fig. 7 is shown the back of one of the cards, with the educational feature being represented by a map of the United States of America, and illustrates how a subject or branch of study can be treated in its entirety or in further presentation of the subject. In this case a map of the United States being placed on the back of the card the individual States or some other appropriate matter would be substituted for the "spots" on the reverse side.

I have endeavored thus to illustrate some of the different modifications under which the invention may be employed and deem them sufficient to fully illustrate its operation.

In carrying my invention into effect I construct, to all intents and purposes, a deck of common playing-cards, which generally consists of fifty-two (52) cards and a "joker" and which is divided into four "suits" of thirteen (13) cards each; but instead of using the conventional "spots" of "hearts," "spades," "diamonds," and "clubs" to represent the "suits" and the value of the cards, as at present, I introduce the educational features, as hereinbefore set forth and illustrated in the drawings. With the "spots" arranged in the usual or conventional order any person familiar with the ordinary playing-cards and the games played therewith can readily adapt themselves to the use of the new and improved card.

I do not wish to be limited to any particular division of a subject or to any particular method of presenting it on the card, as the invention may be applied in many ways; but it is natural and preferable to confine a whole subject, or, if too large, a portion of a subject to a single "pack" of cards, or two or more subjects may be employed in the same "pack," or the divisions may be made on the lines of the "suits." Thus one subject of study may be comprised in one "suit" of thirteen cards and another subject comprised in the next "suit," &c. It is also natural and preferable in some instances to arrange the value or importance of the information to correspond with the value or importance of the cards; but this rule in some cases may not be desirable, as it would tend to prevent, by confusion, the object for which the cards were designed—as, for instance, the countries might be arranged according to their birth, age, area, population, commercial importance, strength of army or navy, &c. In each they would occupy a different rank.

It will be remembered that each card contains an item or items of information which in themselves constitute factors of knowledge in their entirety, so that the value of the information would not be depended upon for any exact arrangement. Yet a whole subject is so linked together that each card becomes a component part of the whole set, and by constantly bringing these parts before the mind in this divided way, and they being reproduced a number of times on the same card in the very places where the eye must rest in order to play the game, they will become the common property of all, as the mind will be able to absorb such small parcels of information with little or no study, and the whole subject will be in time so indelibly imprinted upon the mind as never to be forgotten.

Almost any subject or course of study can be arranged and adjusted as herein stated, and the novelty of thus combining culture and pastime insures its popularity.

Having fully described my invention, what I claim, and desire to secure by Letters Patent, is—

1. Sets of educational playing-cards composed of one or more packs certain cards of a pack having thereon an item or items of information which together form a subject or subjects of study and marks designating certain of the cards as to their relative value and importance, substantially as described.

2. Sets of playing-cards composed of one or more packs certain of the cards of the pack having thereon subjects of study and designating pips, designs or colors whereby the relationship or value of the cards may be determined in the playing of the game substantially as described.

3. In combined playing and educational cards, a set of cards, certain cards having certain items of information in a general scheme, said items being arranged on certain cards to tally both with the serial position of said cards in the playing set and the serial position of the items themselves in the system or scheme of education, substantially as described.

4. A set of playing-cards comprising one or more subjects of educational matter arranged on certain cards in the set and designated by means of text figures and designs as to their relative value or importance in relation to said educational matter whereby games may be played such as the conventional games of whist, euchre and the like, substantially as described.

5. A set of educational playing-cards, certain of said cards being provided with items or parts of information arranged on said cards in the manner of the conventional pips or spots and provided with the usual designating designs of the ordinary cards whereby games may be played embracing one or more subjects of study, substantially as described.

In testimony whereof I have hereunto set my hand in the presence of two subscribing witnesses.

WILLIAM J. HOLMAN, Jr.

Witnesses:
WM. H. DE LACY,
GEO. M. COPENHAVER.